United States Patent
Redmann et al.

(10) Patent No.: US 8,118,225 B2
(45) Date of Patent: Feb. 21, 2012

(54) DEVICE AND METHOD FOR DETECTING AND/OR RECOGNIZING MARKINGS IN/AT/ON TRANSPARENT MARKING CARRIERS

(75) Inventors: Frank Redmann, Halle (DE); Steffen Kürbitz, Halle (DE); Thomas Rainer, Wernlgerode (DE); Reinhard Borek, Halle (DE)

(73) Assignee: Boraident GmbH, Halle (Saale) (DE)

( * ) Notice: Subject to any disclaimer, the term of this patent is extended or adjusted under 35 U.S.C. 154(b) by 552 days.

(21) Appl. No.: 12/299,657

(22) PCT Filed: Mar. 23, 2007

(86) PCT No.: PCT/EP2007/002709
§ 371 (c)(1),
(2), (4) Date: Dec. 29, 2008

(87) PCT Pub. No.: WO2007/128372
PCT Pub. Date: Nov. 15, 2007

(65) Prior Publication Data
US 2009/0236425 A1 Sep. 24, 2009

(30) Foreign Application Priority Data
May 9, 2006 (DE) .......... 10 2006 021 793

(51) Int. Cl.
*G06K 7/10* (2006.01)
(52) U.S. Cl. .......... 235/454; 235/472.01; 235/462.44
(58) Field of Classification Search .......... 235/462.44, 235/462.45, 472.01, 472.02, 472.03, 454
See application file for complete search history.

(56) References Cited

U.S. PATENT DOCUMENTS

| | | | |
|---|---|---|---|
| 6,352,349 B1 | 3/2002 | Braginsky | 362/8 |
| 2001/0000010 A1 | 3/2001 | Okamoto | 235/462.43 |
| 2004/0206819 A1 | 10/2004 | Okada | 235/434 |
| 2006/0131419 A1* | 6/2006 | Nunnink | 235/472.02 |

* cited by examiner

*Primary Examiner* — Karl D. Frech
(74) *Attorney, Agent, or Firm* — Andrew Wilford

(57) ABSTRACT

The invention relates to a device for detecting and/or recognizing markings, in particular for manual handling, comprising a camera for recording a marking and at least one illumination device for illuminating a marking, characterized in that, for detecting and/or recognizing markings (3) on/at/in transparent marking carriers (4), in particular having reflectively polished surfaces, the at least one illumination device (2) is arranged at a distance from the optical axis (A) of the camera (1) in such a way that the light reflection (5) generated by the at least one illumination device (2) at the surface of the transparent marking carrier (4) is arranged at least alongside the marking represented in the camera image, preferably outside the detection region of the camera (1). The invention furthermore relates to a method in which, for detecting and/or recognizing markings (3) on/at/in transparent marking carriers (4), in particular having reflectively polished surfaces, a marking is illuminated by at least one illumination device (2) spaced apart from the optical axis (A) of the camera (1) in such a way that the marking appears in inverted fashion in the camera image, in particular as a bright marking on a dark background, and the light reflection (5) generated by the at least one illumination device (2) at the surface of the transparent marking carrier (4) is arranged at least alongside the marking represented in the camera image, preferably outside the detection region of the camera (1).

12 Claims, 1 Drawing Sheet

Figure 1:
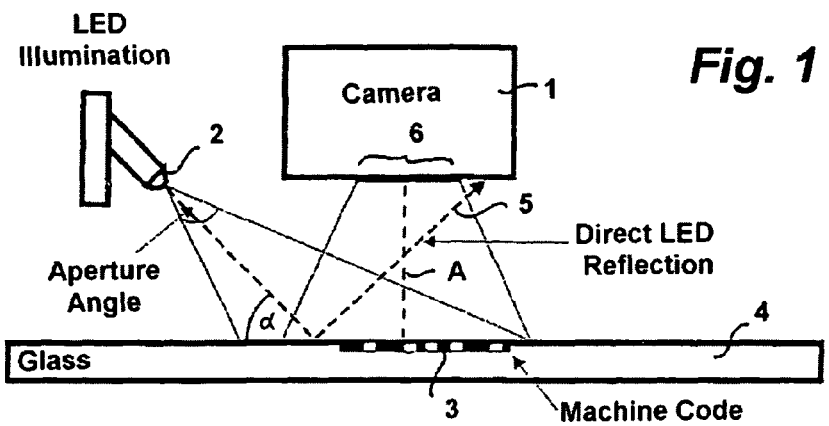

DEVICE AND METHOD FOR DETECTING
AND/OR RECOGNIZING MARKINGS
IN/AT/ON TRANSPARENT MARKING
CARRIERS

CROSS REFERENCE TO RELATED APPLICATIONS

This application is the US national phase of PCT application PCT/EP/2007/002709, filed 23 Mar. 2007, published 14 Nov. 2007 as WO2007/128372, and claiming the priority of German patent application 10 2006021793.4 itself filed 9 May 2006, whose entire disclosures are herewith incorporated by reference.

The invention relates to a device for detecting and/or recognizing markings, comprising a camera for recording the marking and at least one illumination device for illuminating a marking in or at or on transparent marking carriers such as, e.g., a glass plate. The invention furthermore relates to a method for the detection and/or recognition of markings in which an illuminated marking is recorded with a camera.

In the state of the art it has been known to provide transparent media such as, for example, glass, in particular float glass, with markings. In addition to design aspects, such markings are frequently used for product identification or as test markings. The latter markings in particular have, for example, a machine coded contents that informs on the product batch or provides information on the manufacturing or processing process or process progression, in particular in the manufacture of single-pane safety glass.

Markings, in particular those with a machine coded contents (e.g. in the form of data matrix codes or bar codes) on, at or in transparent materials such as, for example, glass can be identified/decoded by conventional reading devices only if there exists a suitable background (e.g. a white sheet of paper) even if the actual coloration of the marking is maximal, e.g. black. The problem of recognizability of markings at, on or in transparent materials essentially depends on the realization of a suitable contrast ratio between marking and background and thus on the absorption or, respectively, reflection in the case of the marking vis-à-vis the absorption or, respectively, reflection in the case of the background.

Machine detection and or recognition or, respectively, identification becomes particularly problematic when the coloration/absorption of a marking is very weak/minor. Even if an ideal background is created, such markings with a weak contrast are not detected or are very hard to detect or, respectively, to recognize by a machine. However, this case of a marking with a weak contrast is the most frequent case in the marking of transparent materials since, particularly for esthetic reasons, such markings on transparent materials are supposed to be as inconspicuous as possible, especially if, for example, a marked glass will form a field of vision later, for example in the case of a window or a car window.

For the marking of transparent media, in particular of float glass, several options are known to the state of the art, e.g. the imprinting of the surface or the destruction of the surface through etching, scratching or laser lettering. While such markings frequently provide a high degree of contrast, they are nevertheless not machine-detectable with conventional reading devices.

A method practiced by the applicant of this invention and established in the market concerns a marking that is produced by pressing a metal ion-containing, in particular a silver ion-containing donor medium, in particular a donor foil, against one side, in particular the bath side of a float glass, with the donor medium being heated through absorption of a laser beam which, for example, illuminates or, if applicable, inscribes the glass through the donor medium so that metal ions, in particular silver ions, are exchanged into the glass and metal particles, in particular silver particles, are formed in the glass. Subsequently, the donor medium, in particular the foil, is removed and combustions residues and a very stable layer of atomic metal, in particular silver, a few nanometers thick are left behind on the glass surface. Due to the combustion residue, such a marking provides a great contrast and will be machine-readable with a suitable background.

Such a marking may be subjected to a washing process, i.e. the glass plate is subjected to washing processes immediately after being marked and during the further finishing process. The combustion residues are thereby removed from the glass surface and the contrast of the marking is greatly reduced. The contrast of the marking is now predominantly formed by the layer of atomic metal, e.g. silver, on the glass and to a lesser degree by the minor absorption of the silver particles in the glass. Such a marking is not machine-readable with conventional devices.

During the manufacture of single-pane safety glass, the glass is thermally tempered, i.e. exposed to a temperature of ca. 700° C. for a brief period at the end of the glass finishing process and then quenched so that the compressive stress is frozen in the glass surface. The marking produced as described above provides a test property for this process. Due to the heating process, it changes its color from light brown to light yellow and thereby becomes somewhat better contrasting. But due to the color shade, such a marking is not machine-readable either with currently available commercial reading devices which mainly operate at a wave length of ca. 635 nm.

In the concrete case of application that mainly forms the basis of the invention, it therefore involves markings that are located close to the tin-containing glass surface of a float glass plate (bath side) and comprise metal, containing in particular silver particle-containing glass areas. To this end, a coding to be read may be present in the glass areas, e.g. in the form of a data matrix code or as a bar code or as any other code. Under normal ambient light, these markings are poorly recognizable with the naked eye and unrecognizable by a machine. However, the invention relates not only to this concrete case of application but also to other markings on transparent media such as, for example, glass plates or other glass elements or components.

In general, reading devices for the detection and/or recognition of markings have been known in the state of the art that comprise, for example, a camera and an illumination device, e.g. a laser unit, for the identification of machine codes. For example at supermarket cashiers, hand-held devices are known that emit a laser beam and evaluate its immediate reflection, e.g. by means of decoding software, in order to read bar codes or EAN codes.

However, such devices always require a non-transparent background of the marking in order to guarantee sufficient contrast of the marking and thus recognizability. Moreover, they always need a diffusely reflecting surface of the marked material to prevent the direct reflexes of the illumination from outshining the camera image. For this reason, in the known devices the codes are located as black lettering on a white background and therefore provide an optimal contrast.

Such devices are not usable for the detection of the markings described above, especially those in accordance with the methods described above, since the transparent surfaces, in particular the quasi reflecting surfaces in particular of float glass with a fire-polished surface, generate too strong a surface reflection so that the codes can not be distinguished therefrom.

The objective of the invention is to provide a device of the type mentioned at the beginning for the detection and/or recognition of markings even with a weak contrast ratio, in particular for those markings that were produced as described above, in particular in such a way that during the detection and/or recognition the weak contrast is increased in such a way that machine legibility will be assured. Thus, the invention relates in particular, but not only, to the reading of markings made of metal ions and/or metal particles on/at/in the bath-side surface of float glass before and/or after a heat treatment process for the manufacture of single-pane safety glass.

This objective is met by a device, in particular for manual operation, with a camera and at least one illumination device for the detection and/or recognition of markings on transparent marking carrier, in particular with reflectively polished surfaces, in which the at least one illumination device is arranged at such a distance from the optical axis of the camera that the light reflection created by the at least one illumination device on the surface of the transparent marking carrier is arranged at least next to the marking represented in the camera image, preferably outside of the detection range of the camera. This objective is also met by a method in which, for the purpose of detecting and/or recognizing markings (3) on/at/in transparent marking carriers (4), in particular those with reflectively polished surfaces, a marking is illuminated by at least one illumination device (2) located at a distance from the optical axis (A) of the camera (1) in such a way that the marking appears inverted in the camera image, in particular as a bright marking on a dark background, and the light reflection (5) created by the at least one illumination device (2) on the surface of the transparent marking carrier (4) is arranged at least next to the marking represented in the camera image, preferably outside of the detection range of the camera (1).

The essential core idea in the case of the device in accordance with the invention and the method is that illumination of the detection range of the camera in the device occurs by means of the at least one illumination device at an angle relative to the optical axis of the camera so that a direct reflection of the light reflected on the surface of a marking carrier is at least separated from the represented marking in the image of the marking detected by the camera even if the reflection itself is still recognizable in the recorded image. Since an overlapping of the direct reflection and the image of the marking is prevented in this way, the marking can be evaluated from the recorded image by means of image processing software and/or decoding software.

Furthermore, a reflection from the second side of the plate is prevented from overlapping with an image of the marking in particular in the case of plane-parallel marking carriers such as glass plates.

It is particularly preferable if the arrangement of the illumination device and the camera as well as the distance of the camera from the surface of the marking carrier is such that the light reflection is arranged at least essentially outside of the lens aperture of the camera. In this way, the reflection is preferably not detected in the first place. This can not always be achieved to the full extent in practice since illumination devices usually do not emit one single directed light beam but emit light in the shape of a cone or a specific cross section profile. With this embodiment, it will at least be possible that the reflection of the most intense, in particular centric light beam of the light cone/profile lies outside of the lens aperture.

Any remaining reflection portions will then not overlap the image of the marking or will be sufficiently small so that an isolation of the image of the marking from the reflection may occur.

The arrangement of the at least one illumination device will preferably be such that the light in its course essentially grazes the surface of the marking carrier. In this regard and also with regard to future mentions of directions and angles, reference is made to an assumed central light beam in the radiation profile of an illumination device even if the latter emits a light cone with a specific opening angle. In this context, a light cone or, respectively, a radiation profile of an illumination device as well as the distance of the illumination device from the marking is preferably selected in such a way that the area of a marking to be detected is fully illuminated.

By means of this kind of illumination, the marking is essentially inverted, i.e. the dark marking pixels become light and the background loses its (light) transparency and becomes black. This is so because in an ideal case, no light that is reflected by the transparent carrier will find its way into the lens of the camera. Thus, for the camera the transparent marking carrier appears dark in areas where no marking is located. In areas of a marking, however, the marking particles diffuse the incoming light in the direction of the camera as well so that the markings appear light and are in optimal contrast with the dark background.

In a preferred embodiment of the device, the at least one illumination device may be arranged at a distance from the optical axis of the camera and at an angle of 0 to 80 degrees, preferably 0 to 45 degrees, relative to the surface of the marking carrier so that the at least one illumination device will illuminate at least the marking area at this angle, preferably the entire detection range of the camera on the marking carrier.

To this end it may be provided that the device comprises not only one illumination device but preferably several illumination devices, in particular illumination diodes and/or laser diodes that are arranged, in particular with regard to all illumination devices, at the same radial distance around the optical axis of the camera. In the case of such an arrangement with several illumination devices, a marking may be illuminated within the detection range of a camera from different directions, with more light being able to be diffused and the contrast with the dark background being able to be further increased. Depending on the number of illumination devices, the latter may encompass the optical axis in frame-like fashion, with the illumination devices, in the case of the same radial distance of the illumination devices from the optical axis, encompassing the optical axis of the camera in ring-shaped fashion or, respectively, lying on a circle. Particularly preferably, the angle of each illumination device relative to the surface of the marking carrier may be the same, in particular in such a way that the centric beams of the illumination cones of each illumination device cross the optical axis of the camera in the same spot.

For an easy to construct and preferred embodiment of the device, in particular with all of the above-described characteristics, the objective of the invention is met by a device that comprises a cup-shaped recording element with a cup bottom, a cup wall and a cup opening, with a recess being arranged in the cup bottom to accommodate a camera and at least one recess, in particular a boring at an angle of 0 to 80 degrees, preferably 0 to 45 degrees relative to the cup opening, being arranged in the cup wall to accommodate at least one illumination device. The above-described conditions are thus fulfilled in structurally particularly simple fashion if the camera and the at least one illumination device are placed in the recesses/borings provided therefor in such a recording element, with the camera being installed in such a way that the lens faces the interior of the cup in the same way as the illumination device(s).

In this context, the cup may have any cross section, in particular polygonal or round, for example tetragonal, with a recess/boring being arranged in at least one partial wall of the cup walls for an illumination device, and preferably one illumination device being arranged in each of the partial walls lying opposite each other. In this way, in the case of a tetragonal cross section, four illumination devices may be provided, or generally speaking, as many recesses for illumination devices as the cross section has corners.

A particularly preferred embodiment provides that the cup wall is essentially cylindrically shaped and thus has an essentially round cross section, in particular with the optical axis of a camera arranged in the recess in the cup bottom being coaxial to the axis of the cylindrical cup wall. Thus, a multitude of recesses, in particular bores, may be arranged in the cylindrical cup wall to accommodate a multitude of illumination devices that encircle the optical axis of the camera, in particular in such a way that a marking arranged centrically/axially in particular on the optical axis can be illuminated from a multitude of directions. In this context, the recesses may have the same distance from each other so that the maximal number of illumination devices is determined only by the circumference of the cup wall and the width extension of the illumination devices.

It is very advantageous in the case of the invention if the cross-sectional surface of the cup wall surrounding the cup opening or an element arranged at the cup opening forms in particular a frame-shaped or annular support area that can be placed on top of a marking carrier, particularly with the detection range of the camera being selected in such a way that the area of the surface of the marking carrier surrounded by the support area can be represented in the camera image. In this way, in the case of such a design, the device may be pressed by hand onto the surface of a marking carrier with the above-described support area, particularly with the correct distance from the camera and thus an optimally focused image being obtained because the depth of the cup, if applicable plus the length, of an element arranged on the recording element corresponds to the focal distance of the camera.

Furthermore, an optimal illumination can be achieved if each illumination device arranged in the recording element has essentially the same distance from the camera and from the support area in the direction of the optical axis of the camera.

In an additional further development of the invention, at least one opening and/or boring and/or channel may be arranged in the recording element to guide cables and/or to accommodate an activating sensor, in particular with the activating sensor being arranged near the support area. In this way, the recording element or a sleeve enveloping it may form a housing graspable by hand that is easy to operate ergonomically since it can be grasped between the thumb and the remaining fingers, with the sensor furthermore being operable for example with the thumb whereby at least one camera image is triggered. In this context it may be provided that at least part of the illumination is on continually or, on the other hand, that the illumination is turned on and a picture is taken only upon sensor operation that is fed to an image processing in order to evaluate the marking information.

The illumination device, e.g. LEDs, may be capable of radiating any desired light wave length that may be adapted for example to the respective marking. In this context, various illumination devices for different light wave lengths may be provided in the device, if necessary, that can be selected depending on the application. For example, every other illumination device may radiate a different wave length in the annular arrangement.

A preferred embodiment of the invention may preferably provide that ultraviolet light can be radiated by means of at least one preferred illumination device, in particular a light diode.

By means of this, markings can be read off float glass plates that, when placed one behind the other, contain similar markings at the same location. These markings overlap each other since the glass is transparent, and they are therefore not easily readable. If in this case an illumination, for example one with LEDs with a great UV portion and preferably with an edge filter in front of the camera is used, only the marking of the first plate can be detected since glass absorbs the UV light.

An additional embodiment may provide that, relative to all above-described embodiments, a cover is arranged at a distance from the focal plane of the camera that preferably lies in the plane of the support area/cup opening of the device, with the cover covering the detection range, preferably the cup opening. The cover may be attached to the device, for example at the cup wall, or form one piece with the latter. The distance between the cover and the focal plane of the camera is selected in such a way that it is larger than the thickness of a glass plate that a marking is to be read from.

In this way, such a device can be pushed laterally over the edge of a glass plate until it abuts the support area. In this way, a marking is illuminated by the side of the camera, with the ambient light being blocked from the rear of the plate by the cover and the contrast being increased even more.

This may also be realized by designing the above-described recording element as a hollow profile, in particular a cylinder, closed on both ends, with the afore-described arrangement of illumination devices. In this case, a recess for the camera is arranged in the bottom of the hollow profile, with the other bottom forming the cover. Vertically to the optical axis, the hollow profile may have a slit that has at least the width of a plate to be examined and that runs across the entire cross section of the hollow profile except for the wall thickness of the wall of the hollow profile so that the device may be pushed onto the plate via the plate edge, providing a reflection-free illumination with an optimal darkening of the surrounding.

With the aid of such a device, manual as well as machine operation is possible, where, in the case of the latter, a pressing of the device to a marking carrier by means of a pressing mechanism provided for that purpose may occur or, if a pressing action is not provided, the device is positioned automatically at the focal distance of the camera from the marking carrier.

One embodiment of the invention is represented in the following figures. Shown are in:

FIG. 1: the principle of the invention

Figure 2:
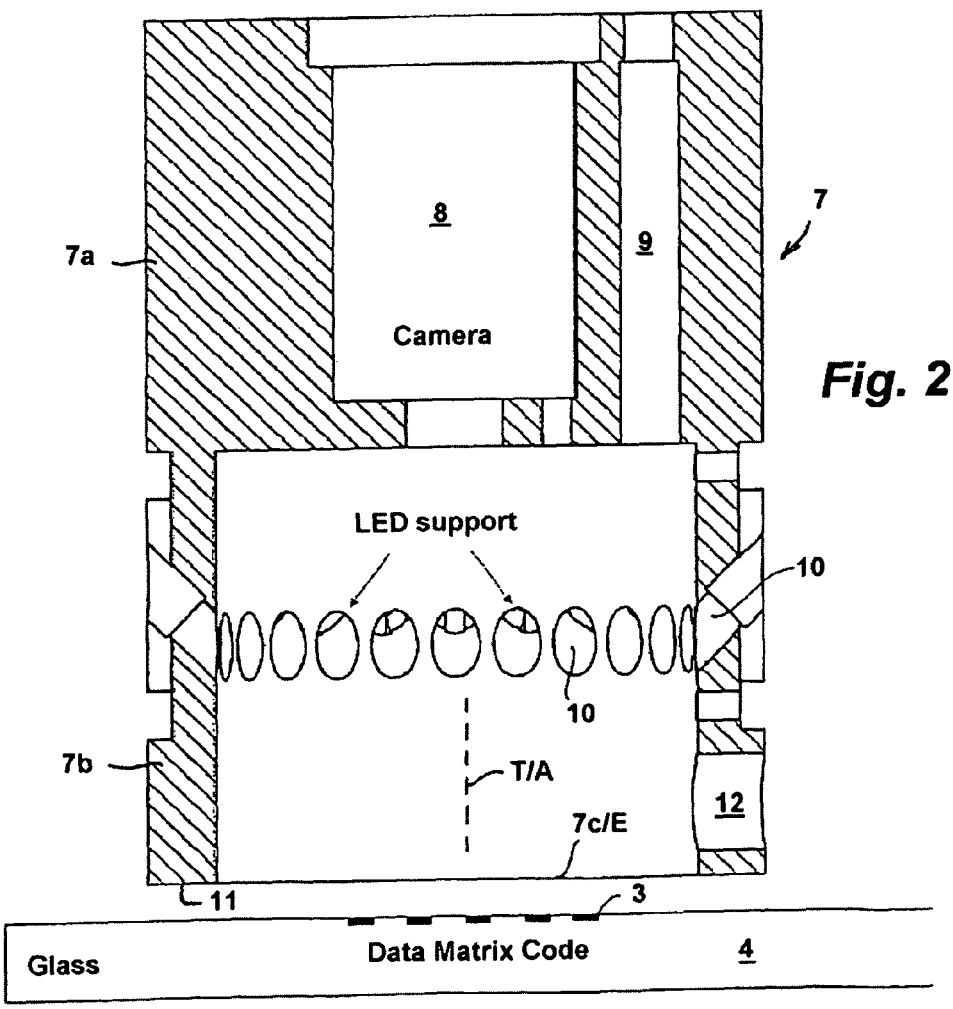

FIG. 2: a recording element

FIG. 1 shows the principle of the invention. The device comprises a camera 1, as well as at least one illumination device 2, for example at least one light emitting diode. The latter is arranged at a radial distance from the optical axis A of the camera 1 and illuminates the machine code of a marking 3 in the disc 4, in this case at an angle α of ca. 45 degrees. Therefore, in the case of the selected distance of the camera 1 from the glass 4, the direct light reflection 5 of the light emitting diode 2 lies outside of the lens aperture 6 of the camera 1. This prevents the reflection 5 from overlapping the image of the marking taken by the camera 1.

Since the illumination device 2 has an angle of aperture during the emission of light, the entire surface of the marking 3 is illuminated. The light diffused by the marking 3 reaches the camera 1 and leads to an image being taken of the marking. Since a diffusion of light occurs only in the marking areas but not on the fire-polished surface of the float glass 4, the glass itself appears dark to the camera. This results in an optimal contrast during the recording of the marking which can subsequently be evaluated by means of image processing software.

FIG. 2 shows a recording element 7 of the device in accordance with the invention. The recording element is similar to a cup standing on its head, with a recess 8 in the form of a centric boring being arranged in the bottom 7a of the cup in the direction of the cup axis T to accommodate a camera not shown here or a camera module. In addition to the boring 8, an eccentric boring 9 may be arranged for a cable for the power supply and for data of the camera.

The cup moreover has a cup wall 7b which is pictured here with a round cross section so that the recording element 7 forms a cylinder closed at the top. A multitude of borings 10 is arranged in the cup wall approximately centrally relative to the cup depth that run at an angle α of approximately 45 degrees which corresponds to the above-described angle in FIG. 1.

The borings 10 serve to accommodate light emitting diodes that illuminate the plane E with their light at this angle α, with the plane being determined by the cup opening 7c. This plane E is the focus plane of the camera so that the marking 3 in the glass 4 automatically lies in focus when the recording element with the camera located in it is placed on top of the glass. To this effect, the cup opening 7c has a circumferential front area 11 that serves as support surface and that is formed by the cross sectional surface of the cup wall 7b.

Another boring 12 is arranged in the cup wall 7b near the support area 11 into which a sensor may be inserted to operate the device and to activate a camera shot.

The recording element shown here may itself be arranged in a sleeve that forms the external housing of the device.

All versions of the embodiment mentioned here and of the general part are optional and may be arbitrarily combined with each other or used alternatively.

The invention claimed is:

1. A device for detecting or recognizing markings on a substrate, the device comprising:
   a cup-shaped housing having
      a cylindrical wall centered on an axis, defining a chamber, having a rim lying substantially in a plane, and formed with a circularly annular array centered on the axis of bores each extending at an angle of 0°-80° to the rim plane, and
      a base from which the wall extends and formed with an axially open seat;
   a camera in the seat having an optical axis directed through the chamber at least generally parallel to the chamber axis; and
   respective light-emitting or laser diodes in the bores emitting respective light beams directed out of the chamber and impinging the rim plane at the angle of 0° to 80°.

2. The device defined in claim 1 the LED's and the bores are oriented such that beams from the light-emitting or laser diodes cross the optical axis at the same point.

3. The device defined in claim 2 wherein the optical axis coincides with the axis of the chamber.

4. The device defined in claim 1 wherein the rim forms an annular face engageable with the substrate and defining an area corresponding to an image size of the camera.

5. The device defined in claim 1 wherein the light-emitting or laser diodes are uniformly axially spaced from the plane of the rim and from the camera.

6. The device defined in claim 1 wherein the housing is formed with at least one further seat open adjacent the rim and adapted to hold an activation sensor.

7. The device defined in claim 1 wherein the housing is of a size holdable in one hand.

8. The device defined in claim 1 wherein at least one of the light-emitting or laser diodes emits ultraviolet light.

9. The device defined in claim 1, further comprising
   a cover engageable with the housing on a focus plane of the camera for blocking ambient light from the back side of a transparent substrate.

10. A method of detecting or recognizing markings of metal-particles in or on a transparent glass plate, the method comprising the steps of:
    directing an optical axis from an aperture of a camera at the markings;
    illuminating the markings with an annular array of light sources surrounding the optical axis such that light from the sources is not reflected back into the aperture and the markings appear in the camera image in the form of a bright marking on a dark background; and
    orienting the light sources such that beams emitted thereby impinge the markings at an angle of between 0° and 80° and reflections of the beams off the glass plate do not enter the aperture of the camera.

11. The method defined in claim 10, further comprising
    blocking ambient light from a back side of the plate with a cover that overlies the plate in the area of the detection range of the camera when a marking is recorded.

12. The method defined in claim 10 wherein at least one of the light sources emits ultraviolet light, the method further comprising the step of blocking reflections of the ultraviolet light with an edge filter.

* * * * *